(12) United States Patent
Takafuji et al.

(10) Patent No.: US 10,336,872 B2
(45) Date of Patent: Jul. 2, 2019

(54) RESIN COMPOSITION AND FILM

(71) Applicant: KURARAY CO., LTD., Kurashiki-shi (JP)

(72) Inventors: Masahiro Takafuji, Kurashiki (JP); Masaki Kato, Kurashiki (JP); Yoko Mori, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/517,749

(22) PCT Filed: Oct. 6, 2015

(86) PCT No.: PCT/JP2015/078399
§ 371 (c)(1),
(2) Date: Apr. 7, 2017

(87) PCT Pub. No.: WO2016/056570
PCT Pub. Date: Apr. 14, 2016

(65) Prior Publication Data
US 2017/0306112 A1 Oct. 26, 2017

(30) Foreign Application Priority Data
Oct. 9, 2014 (JP) ................................ 2014-208314

(51) Int. Cl.
| | |
|---|---|
| B65D 65/46 | (2006.01) |
| C08J 5/18 | (2006.01) |
| C08K 5/17 | (2006.01) |
| C08K 5/19 | (2006.01) |
| C08K 5/42 | (2006.01) |
| C08L 29/04 | (2006.01) |

(52) U.S. Cl.
CPC ............... *C08J 5/18* (2013.01); *B65D 65/46* (2013.01); *C08K 5/17* (2013.01); *C08K 5/19* (2013.01); *C08K 5/42* (2013.01); *C08L 29/04* (2013.01); *C08J 2329/04* (2013.01)

(58) Field of Classification Search
CPC ......... B65D 65/46; C08J 5/18; C08J 2329/04; C08K 5/17; C08K 5/42; C08K 5/19; C08L 29/04
See application file for complete search history.

(56) References Cited
U.S. PATENT DOCUMENTS

| | | | |
|---|---|---|---|
| 4,144,388 | A | 3/1979 | Yatsu et al. |
| 6,166,117 | A | 12/2000 | Miyazaki |
| 6,818,709 | B1 | 11/2004 | Vicari |
| 2005/0065272 | A1 | 3/2005 | Vicari |
| 2005/0222355 | A1 | 10/2005 | Vicari |
| 2006/0275567 | A1 | 12/2006 | Vicari |

FOREIGN PATENT DOCUMENTS

| | | |
|---|---|---|
| CN | 1261605 | 8/2000 |
| CN | 1427026 | 7/2003 |
| CN | 101193955 | 6/2008 |
| CN | 104903209 | 9/2015 |
| JP | 63-168437 A | 7/1988 |
| JP | 6-88003 A | 3/1994 |
| JP | 6-240091 A | 8/1994 |
| JP | 9-40834 A | 2/1997 |
| JP | 9-77947 A | 3/1997 |
| JP | 9-272773 A | 10/1997 |
| JP | 9-272774 A | 10/1997 |
| JP | 11-222546 A | 8/1999 |
| JP | 2001-106854 A | 4/2001 |
| JP | 2005-139240 A | 6/2005 |
| JP | 2008-542520 A | 11/2008 |
| JP | 2008-542521 A | 11/2008 |
| WO | 2006/132680 A1 | 12/2006 |
| WO | 2006/132729 A1 | 12/2006 |

OTHER PUBLICATIONS

International Search Report dated Dec. 28, 2015 in PCT/JP2015/078399 filed Oct. 6, 2015.
Extended European Search Report dated Apr. 10, 2018 in European Patent Application No. 15849157.1, citing documents AA and AO therein, 5 pages.
Letter from Osha Liang with cited Appendices dated Mar. 29, 2019.

*Primary Examiner* — Patrick D Niland
(74) *Attorney, Agent, or Firm* — Oblon, McClelland, Maier & Neustadt, L.L.P.

(57) ABSTRACT

A resin composition that enables formation of a film superior in cold water solubility, mechanical strength, and chemical resistance is provided. The resin composition comprises a modified PVA comprising a monomer unit represented by formula (I), and an amine compound represented by formula (II):

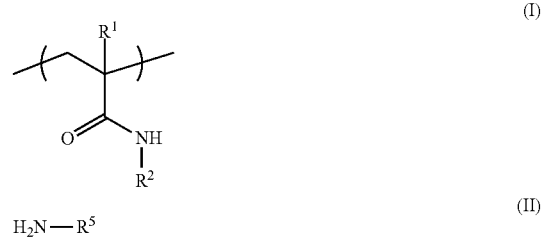

a content of the amine compound with respect to 100 parts by mass of the modified PVA being from 0.01 parts by mass to 1 part by mass. In the formula (I), $R^1$ represents a hydrogen atom, or an alkyl group having 1 to 8 carbon atoms; and $R^2$ represents $-R^3-SO_3^-X^+$, $-R^3-N^+(R^4)_3$ $Cl^-$, or a hydrogen atom, $R^3$ representing an alkanediyl group having 1 to 10 carbon atoms, $X^+$ representing a hydrogen atom, a metal atom, or an ammonium group, and $R^4$ representing a linear or branched alkyl group having 1 to 5 carbon atoms. In the formula (II), $R^5$ represents $-R^{3'}-SO_3^-X^{+'}$, $-R^{3'}-N^+(R^{4'})_3Cl^-$, or a hydrogen atom.

5 Claims, No Drawings

RESIN COMPOSITION AND FILM

TECHNICAL FIELD

The present invention relates to a resin composition comprising: a modified polyvinyl alcohol comprising a specific acrylamide unit; and a specific amine compound, and to a film formed from the resin composition.

BACKGROUND ART

Polyvinyl alcohol (hereinafter, may be abbreviated as "PVA") has been known as a water soluble synthetic polymer and is superior in strength characteristics, film-forming properties, etc. to other synthetic polymers. Therefore, PVA has been widely used for applications such as paper processing, fiber processing, adhesives, stabilizers for emulsion polymerization and suspension polymerization, binders for inorganic substances and films, for example.

Exemplary intended use of the film described above may include a water soluble film. In recent years, various types of chemicals such as pesticides, laundry detergents, bleaching agents, toiletry products, industrial chemicals, etc., are being used in such a manner that the chemical is hermetically packaged in a water soluble film each in a certain equal quantity (unit packaging), and put into water in the packaged state upon use, whereby a content as well as the packaging film is dissolved or dispersed in water. Advantages of the unit packaging are that a user can use harmful chemicals without making direct contact therewith upon use, that there is no need to quantitatively determine a chemical upon use by virtue of packaging in a certain equal quantity, that no disposal is required of a container in which a chemical is packaged, and the like.

Since an increase in a degree of saponification of PVA is accompanied by an increase in crystallinity, and in turn an increase in a proportion of crystal portions which do not dissolve in cold water, for a cold water soluble film for unit packaging and the like, a partially saponified unmodified PVA is used, not PVA having a high degree of saponification, which is referred to as saponified PVA. A water soluble film formed by using the partially saponified unmodified PVA has advantageous features such as superior solubility in cold water, superior mechanical strength, and the like.

Conventional partially saponified unmodified PVA films have a disadvantage that, in a case where an alkaline or acidic substance is packaged therein, an acetoxy group remaining in the film may be saponified during storage to allow crystallization of PVA to proceed, whereby the film is likely to be insolubilized. The partially saponified unmodified PVA films have a further disadvantage that, in a case where a chlorine-containing compound such as a pesticide and a microbicide is packaged therein and then stored for a long period of time, the film may be colored and hardened, and water solubility thereof may decrease with time to eventually make the film insoluble or hardly soluble in water, whereby the compound is less likely to be dissolved or dispersed in water in a state of remaining packaged in the film.

In order to solve such problems, Patent Document 1 discloses a water soluble film formed from a PVA comprising an oxyalkylene group, a sulfonic acid group, or a cationic group. Patent Document 2 discloses a water soluble film formed from a composition comprising: a modified PVA having a monomer unit containing a carboxy group and/or a sulfonic acid group; and a polyhydric alcohol. Patent Document 3 discloses a cold water soluble film comprising a modified PVA having a vinyl alcohol unit and a 2-acrylamide-2-methylpropanesulfonic acid unit. Patent Document 4 discloses a PVA film in which PVA comprises an amine acid.

However, in recent years, in light of workability, environmental protection, etc., a water soluble film that concomitantly meets required characteristics of cold water solubility, mechanical strength, and chemical resistance has been demanded. In this respect, the above described water soluble films formed from resin compositions comprising the aforementioned conventional PVA have not sufficiently met these required characteristics.

PRIOR ART DOCUMENTS

Patent Documents

Patent Document 1: Japanese Unexamined Patent Application, Publication No. S63-168437
Patent Document 2: Japanese Unexamined Patent Application, Publication No. 2005-139240
Patent Document 3: Japanese Unexamined Patent Application (Translation of PCT Application), Publication No. 2008-542520
Patent Document 4: Japanese Unexamined Patent Application, Publication No. H6-240091

SUMMARY OF THE INVENTION

Problems to be Solved by the Invention

The present invention was made in view of the foregoing circumstances and an objective of the present invention is to provide: a resin composition that enables formation of a film superior in cold water solubility, mechanical strength and chemical resistance; and a film formed from the resin composition.

Means for Solving the Problems

In order to attain the aforementioned objective, the present inventors have thoroughly investigated and consequently found that a resin composition comprising: a modified PVA comprising a particular acrylamide unit; and a particular amine compound, wherein a content of the particular amine compound falls within a particular range, enables formation of a film superior in cold water solubility, mechanical strength and chemical resistance. Further studies based on this finding have led to completion of the present invention.

An aspect of the present invention made for solving the aforementioned problems is a resin composition comprising a modified PVA (hereinafter, may be also referred to as a "modified PVA (A)") comprising a monomer unit (hereinafter, may be also referred to as "monomer unit (I)") represented by the following formula (I), and an amine compound (hereinafter, may be also referred to as "amine compound (B)") represented by the following formula (II):

wherein in the formula (I), $R^1$ represents a hydrogen atom, or a linear or branched alkyl group having 1 to 8 carbon atoms, and $R^2$ represents $—R^3—SO_3^-X^+$, $—R^3—N^+(R^4)_3Cl^-$, or a hydrogen atom, $R^3$ representing a linear or branched alkanediyl group having 1 to 10 carbon atoms, $X^+$ representing a hydrogen atom, a metal atom, or an ammonium group, and $R^4$ representing a linear or branched alkyl group having 1 to 5 carbon atoms, wherein a plurality of $R^4$s may be identical or different; and

(II)

wherein in the formula (II), $R^5$ represents $—R^{3\prime}—SO_3^-X^{+\prime}$, $—R^{3\prime}—N^+(R^{4\prime})_3Cl^-$, or a hydrogen atom, $R^{3\prime}$ representing a linear or branched alkanediyl group having 1 to 10 carbon atoms, $X^{+\prime}$ representing a hydrogen atom, a metal atom, or an ammonium group, and $R^{4\prime}$ representing a linear or branched alkyl group having 1 to 5 carbon atoms, wherein a plurality of $R^{4\prime}$s may be identical or different, wherein a content of the amine compound (B) with respect to 100 parts by mass of the modified PVA (A) is 0.01 parts by mass or greater and 1 part by mass or less.

Due to: comprising the modified PVA (A) comprising the particular acrylamide unit, and the particular amine compound (B); and the content of the amine compound (B) falling within the above particular range, the resin composition enables formation of a film superior in cold water solubility, mechanical strength, and chemical resistance. Although not necessarily clarified, the reason for achieving the effects described above due to the resin composition comprising the amine compound (B) is inferred that, for example, actions by the amine compound (B) of inhibiting hydrolysis of an amide group which may be caused when the modified PVA (A) is in contact with a chemical, and of buffering pH may contribute to the effects.

The viscosity average degree of polymerization of the modified PVA (A) is preferably 300 or greater and 3,000 or less; and the degree of saponification of the modified PVA (A) is preferably 82 mol % or greater and 99.5 mol % or less. Due to having the viscosity average degree of polymerization and the particular degree of saponification falling within the above ranges, the modified PVA (A) enables formation of a film superior in cold water solubility, mechanical strength, and chemical resistance. The viscosity average degree of polymerization and the degree of saponification are obtained by methods defined in JIS-K6726-1994.

The percentage content of the monomer unit (I) with respect to total monomer units in the modified PVA (A) is preferably 0.05 mol % or greater and 10 mol % or less. When the content of the monomer unit (I) falls within the above particular range, formation of a film more superior in cold water solubility, mechanical strength, and chemical resistance is enabled.

The modified PVA (A) preferably further comprises a structural unit (hereinafter, may be also referred to as "structural unit (III)") represented by the following formula (III). The percentage content of the structural unit (III) with respect to total monomer units in the modified PVA (A) is preferably 0.001 mol % or greater and 0.5 mol % or less.

(III)

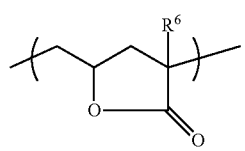

wherein in the formula (II), $R^6$ represents a hydrogen atom, or a linear or branched alkyl group having 1 to 8 carbon atoms.

Due to comprising the particular structural unit (III) at a specific percentage content, the modified PVA (A) enables formation of a film further more superior in cold water solubility, mechanical strength, and chemical resistance.

Another aspect of the present invention further encompasses a film formed from the resin composition. Due to being formed from the resin composition, the film is superior in cold water solubility, mechanical strength, and chemical resistance.

Effects of the Invention

As explained above, the resin composition according to an aspect of the present invention enables formation of a film superior in cold water solubility, mechanical strength, and chemical resistance. Therefore, the resin composition and the film according to aspects of the present invention may be suitably used in a packaging material for various types of chemicals such as laundry detergents, bleaching agents and pesticides.

DESCRIPTION OF EMBODIMENTS

Resin Composition

The resin composition according to an embodiment of the present invention comprises the modified PVA (A) and the amine compound (B). In addition to the modified PVA (A) and the amine compound (B), the resin composition may further comprise an optional component. Hereinafter, each component will be described.

Modified PVA (A)

The modified PVA (A) comprised in the resin composition comprises the monomer unit (I) represented by the following formula (I), and in general further comprises a vinyl alcohol unit. The modified PVA (A) preferably further comprise a structural unit (III) represented by a formula (III) described later. The modified PVA (A) may further comprise other monomer unit. The "structural unit" as referred to means a partial structure comprised in the modified PVA (A), and is derived from at least one monomer. The "monomer unit" means a structural unit derived from one monomer.

Monomer Unit (I)

The monomer unit (I) is represented by the following formula (I).

(I)

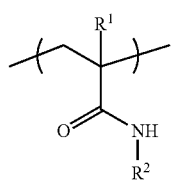

In the formula (I), $R^1$ represents a hydrogen atom, or a linear or branched alkyl group having 1 to 8 carbon atoms, and $R^2$ represents $—R^3—SO_3^-X^+$, $—R^3—N^+(R^4)_3Cl^-$, or a hydrogen atom, $R^3$ representing a linear or branched alkanediyl group having 1 to 10 carbon atoms, $X^+$ representing a hydrogen atom, a metal atom, or an ammonium group, and $R^4$ representing a linear or branched alkyl group having 1 to 5 carbon atoms, wherein a plurality of $R^4$s may be identical or different.

Examples of the linear or branched alkyl group having 1 to 8 carbon atoms which may be represented by $R^1$ include a methyl group, an ethyl group, a n-propyl group, an isopropyl group, a n-butyl group, an isobutyl group, a tert-butyl group, a n-pentyl group, and the like.

As $R^1$, a hydrogen atom and a methyl group are preferred, and a hydrogen atom is more preferred, in light of ease in synthesis, etc., of the modified PVA (A).

Examples of the linear or branched alkanediyl group having 1 to 10 carbon atoms represented by $R^3$ include —$CH_2$—, —$CH(CH_3)$—, —$CH_2$—$CH_2$—, —$CH(CH_3)$—$CH_2$—, —$CH(CH_2CH_3)$—$CH_2$—, —$CH(CH_3)$—$CH(CH_3)$—, —$C(CH_3)_2$—$CH_2$—, —$C(CH_3)_2$—$CH(CH_3)$—, —$CH_2$—$CH_2$—$CH_2$—, —$CH_2$—$CH_2$—$CH_2$—$CH_2$—, and the like, wherein in the case where $R^3$ is asymmetric, an orientation thereof is not particularly limited.

As $R^3$, —$C(CH_3)_2$—$CH_2$— and —$CH_2$—$CH_2$—$CH_2$— are preferred. In the case where $R^3$ represents —$C(CH_3)_2$—$CH_2$—, such an orientation of $R^3$ that, when indicated together with —$C(=O)NH$— which is adjacent to $R^3$, —$C(=O)NH$—$C(CH_3)_2$—$CH_2$— is given is preferred. In other words, in the case where $R^3$ represents —$C(CH_3)_2$—$CH_2$—, as $R^2$, —$C(CH_3)_2$—$CH_2$—$SO_3^-X^+$, and —$C(CH_3)_2$—$CH_2$—$N^+(R^4)_3Cl^-$ are preferred.

The metal atom which may be represented by $X^+$ is exemplified by alkali metal atoms (lithium atom, sodium atom, potassium atom, etc.), alkaline earth metal atoms (calcium atom, etc.), and the like.

Examples of the ammonium group which may be represented by $X^+$ include a tetramethylammonium group, a tetraethylammonium group, a tetrapropylammonium group, $NH_4$, a monomethylammonium group, a dimethylammonium group, a trimethylammonium group, and the like.

As $X^+$, a hydrogen atom and an alkali metal atom are preferred, and a hydrogen atom and a sodium atom are more preferred, in light of cold water solubility of a resulting film.

Examples of the linear or branched alkyl group having 1 to 5 carbon atoms represented by $R^4$ include a methyl group, an ethyl group, a n-propyl group, an isopropyl group, a n-butyl group, an isobutyl group, a sec-butyl group, a n-pentyl group, and the like. Of these, a methyl group is preferred.

The lower limit of the percentage content of the monomer unit (I) with respect to total monomer units in the modified PVA (A) is preferably 0.05 mol %, more preferably 0.10 mol %, and still more preferably 0.15 mol %. Meanwhile, the upper limit of the percentage content of the monomer unit (I) is preferably 10 mol %, more preferably 8 mol %, and still more preferably 7 mol %. When the percentage content of the monomer unit (I) falls within the above range, the modified PVA (A) enables formation of a film more superior in cold water solubility, mechanical strength, and chemical resistance. The term "total monomer units" as referred to means a total of monomer units constituting the modified PVA (A). It is to be noted that the total is calculated based on the assumption that, in a case where a structural unit is composed of n monomer units, n monomer units are present per one structural unit (n is an integer of 1 or greater). For example, the structural unit (III) described later is composed of two monomer units, and therefore the total is calculated based on the assumption that two monomer units are present per structural unit (III).

Structural Unit (III)

The structural unit (III) is represented by the following formula (III). The modified PVA (A) preferably further comprise the structural unit (III). Due to further comprising the structural unit (III), the modified PVA (A) enables formation of a film further more superior in cold water solubility, mechanical strength, and chemical resistance.

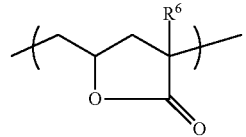

(III)

In the formula (III), $R^6$ represents a hydrogen atom, or a linear or branched alkyl group having 1 to 8 carbon atoms.

Examples of the linear or branched alkyl group which may be represented by $R^6$ include groups similar to those exemplified in connection with $R^1$, and the like.

As $R^6$, a hydrogen atom and a methyl group are preferred, and a hydrogen atom is more preferred.

In the case of the modified PVA (A) comprising the structural unit (III), the lower limit of the percentage content of the structural unit (III) with respect to total monomer units in the modified PVA (A) is preferably 0.001 mol %, more preferably 0.005 mol %, still more preferably 0.01 mol %, and particularly preferably 0.02 mol %. Meanwhile, the upper limit of the percentage content of the structural unit (III) is preferably 0.5 mol %, more preferably 0.4 mol %, and still more preferably 0.2 mol %. When the percentage content of the structural unit (III) falls within the above range, formation of a film even more superior in cold water solubility, mechanical strength, and chemical resistance is enabled.

As described later, the structural unit (III) is formed through a reaction between the vinyl alcohol unit and the monomer unit (I). In other words, a percentage content of the monomer units constituting the structural unit (III) is equal to twice the percentage content of the structural unit (III). The specific lower limit of the percentage content of the monomer units constituting the structural unit (III) is typically 0.002 mol %, preferably 0.01 mol %, more preferably 0.02 mol %, and still more preferably 0.04 mol %. Meanwhile, the upper limit of the percentage content of the monomer units is typically 1 mol %, preferably 0.8 mol %, and more preferably 0.4 mol %. When the percentage content of the monomer units constituting the structural unit (III) falls within the above range, adjusting the percentage content of the structural unit (III) is enabled to fall within the range specified above.

The respective percentage contents of the monomer unit (I) and the structural unit (III) can be determined by $^1$H-NMR measurement of the modified PVA (A). Specifically, these contents can be determined by dissolving the modified PVA (A) in $D_2O$ and carrying out the measurement by using a 600-MHz $^1$H-NMR measurement device at 80° C. For example, in the case where the modified PVA (A) comprises: as the monomer unit (I), a monomer unit (AMPS unit) derived from 2-acrylamide-2-methylpropane sodium sulfonate (AMPS) represented by the following formula (I'); as the structural unit (III), a structural unit (structural unit (III')) represented by the following formula (III'); and as a vinyl ester unit described later, a monomer unit (vinyl acetate unit) derived from vinyl acetate represented by the following formula (IV'), and the modified PVA (A) comprises sodium acetate as an impurity, the percentage content of the monomer unit (I) and the percentage content of the structural unit (III) can be determined by the following method.

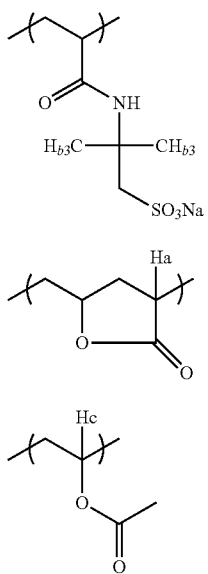

First, a peak area of 2.8 ppm to 3.1 ppm derived from Ha in the structural unit (III') is defined as "a"; a value obtained by dividing by 6 a peak area of 1.45 ppm to 1.55 ppm derived from six Hbs in the AMPS unit is defined as "b"; a peak area of 4.5 ppm to 5.4 ppm derived from Hc in the vinyl acetate unit is defined as "c"; a value obtained by dividing by 3 a peak area of 1.9 ppm to 2.0 ppm derived from three protons in the sodium acetate is defined as "d"; and a peak area of 0.2 ppm to 2.8 ppm derived from a methylene group is defined as "A". A peak area per proton of the vinyl alcohol unit is calculated by the following formula and defined as "e", on the basis of: the number of protons having a chemical shift in a range of 0.2 ppm to 2.8 ppm in the structural units for which a to d have been calculated; and a value of A.

$$e=[A-a\times 4-b\times 9-c\times 5-d\times 3]/2$$

Subsequently, on the basis of values of a to e, respective percentage contents of the monomer unit (I) and the structural unit (III) are calculated by the following formulae.

Percentage content of monomer unit (I) (mol %)=$b\times 100/(2\times a+b+c+e)$

Percentage content of structural unit (III) (mol %)=$a\times 100/(2\times a+b+c+e)$ A percentage content of the monomer units constituting the structural unit (III) can also be calculated by the following formula.

Percentage content of monomer units constituting structural unit (III) (mol %)=$2\times a\times 100/(2\times a+b+c+e)$ As described above, the structural unit (III) is composed of two monomer units. Consequently, a sum of the percentage content of the monomer unit (I), the percentage content of the monomer units constituting the structural unit (III), and the percentage content of other monomer units is generally 100 mol %; whereas a sum of the percentage content of the monomer unit (I), the percentage content of the structural unit (III), and the percentage content of other monomer units is typically less than 100 mol %.

Production Method of Modified PVA (A)

The modified PVA (A) may be produced by, for example, saponifying in an alcohol solution using an alkali catalyst or an acid catalyst, a vinyl ester copolymer obtained by copolymerizing a vinyl ester monomer with a monomer for giving the monomer unit (I) (e.g., $H_2C=C(R^1)-C(=O)NH-R^2$ and the like). The structural unit (III) may be formed by reacting a hydroxyl group comprised in a vinyl alcohol unit obtained by saponification of a vinyl ester unit with an amide group comprised in the monomer unit (I).

Examples of the vinyl ester monomer include vinyl formate, vinyl acetate, vinyl propionate, vinyl valerate, vinyl caprate, vinyl laurate, vinyl stearate, vinyl benzoate, vinyl pivalate, vinyl versatate, and the like. Of these, vinyl acetate is preferred.

Examples of a process for copolymerizing the vinyl ester monomer with a monomer for giving the monomer unit (I) include known processes such as bulk polymerization, solution polymerization, suspension polymerization, emulsion polymerization, and the like. Of these, bulk polymerization that is carried out without a solvent and solution polymerization that is carried out with a solvent such as an alcohol are preferred, and solution polymerization that is carried out in the presence of a lower alcohol is more preferred in light of enhancing the effects of the present invention. As the lower alcohol, alcohols having 3 or less carbon atoms are preferred, methanol, ethanol, n-propanol and isopropanol are more preferred, and methanol is even more preferred. Upon a polymerization reaction by bulk polymerization or solution polymerization, either a batchwise system or a continuous system may be employed as a reaction system.

Examples of an initiator used for the polymerization reaction include known initiators such as: azo initiators e.g., 2,2'-azobisisobutyronitrile, 2,2'-azobis(2,4-dimethylvaleronitrile), 2,2'-azobis(4-methoxy-2,4-dimethylvaleronitrile), etc.; peroxide initiators e.g., benzoyl peroxide, n-propyl peroxydicarbonate, etc.; and the like. A polymerization temperature in carrying out the polymerization reaction is not particularly limited and a range of 5° C. or greater and 200° C. or less is appropriate.

Upon copolymerizing the vinyl ester monomer with the monomer giving the monomer unit (I), a further copolymerizable monomer may be copolymerized therewith within a range not leading to impairment of the effects of the present invention. Examples of such a copolymerizable monomer include: α-olefins such as ethylene, propylene, 1-butene, isobutene, and 1-hexene; acrylamide derivatives such as N-methylacrylamide and N-ethylacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether, and n-butyl vinyl ether; hydroxy group-containing vinyl ethers such as ethylene glycol vinyl ether, 1,3-propanediol vinyl ether, and 1,4-butanediol vinyl ether; allyl acetates; allyl ethers such as propyl allyl ether, butyl allyl ether, and hexyl allyl ether; monomers having an oxyalkylene group; isopropenyl acetate; hydroxy group-containing α-olefins such as 3-buten-1-ol, 4-penten-1-ol, 5-hexene-1-ol, 7-octen-1-ol, 9-decen-1-ol, and 3-methyl-3-buten-1-ol; monomers having a silyl group such as vinyltrimethoxysilane, vinylmethyldimethoxysilane, vinyldimethylmethoxysilane, vinyltriethoxysilane, vinylmethyldiethoxysilane, vinyldimethylethoxysilane, 3-(meth)acrylamidepropyltrimethoxysilane, 3-(meth)acrylamidepropyltriethoxysilane; and the like. The upper limit of the amount of these monomers used varies according to a purpose and an intended use thereof, and is preferably 20 mol % and more preferably 10 mol % with respect to total monomers used in the copolymerization.

The modified PVA (A) can be obtained by saponifying in an alcohol solvent and then drying the vinyl ester copolymer obtained by the aforementioned process. For obtaining the modified PVA (A), particularly a moisture content of a saponification raw material solution to be subjected to the saponification, a resin temperature of the modified PVA (A) during drying, and a time period of the drying preferably fall within particular ranges as specified later.

The saponification raw material solution can be prepared by adding a small amount of water to a solution comprising the vinyl ester copolymer obtained by the aforementioned copolymerization process and a solvent. The lower limit of the moisture content of the saponification raw material solution thus obtained is preferably 1% by mass, and more preferably 1.2% by mass. Meanwhile, the upper limit of the moisture content of the saponification raw material solution thus obtained is preferably 2% by mass, and more preferably 1.8% by mass. When the moisture content is less than the lower limit, lactonization is more likely to proceed and the percentage content of the structural unit (III) tends to be too large. On the other hand, when the moisture content is greater than the upper limit, ring-opening of a lactone structure is more likely to proceed and formation of the structural unit (III) tends to be inhibited.

Examples of the solvent that may be used for the saponification reaction include methanol, methyl acetate, dimethylsulfoxide, diethylsulfoxide, dimethylformamide, and the like. Of these solvents, methanol is preferred.

As a catalyst for the saponification reaction of the vinyl ester copolymer, in general, an alkaline substance is used. Examples of the alkaline substance include: alkali metal hydroxides such as potassium hydroxide and sodium hydroxide; alkali metal alkoxides such as sodium methoxide; and the like. The lower limit of the amount of the catalyst used is, in a molar ratio to the vinyl ester unit in the vinyl ester copolymer, preferably 0.002 and more preferably 0.004. On the other hand, the upper limit of the amount of the catalyst used is, in molar ratio to the vinyl ester unit in the vinyl ester copolymer, preferably 0.2 and more preferably 0.1. The saponification catalyst may be added either at once in an initial stage of the saponification reaction, or in a stepwise manner in which a part of the catalyst is added in the initial stage and the rest is added during the saponification reaction.

The lower limit of a temperature for the saponification reaction is preferably 5° C., and preferably 20° C. Meanwhile, the upper limit of the temperature for the saponification reaction is preferably 80° C., and more preferably 70° C. The lower limit of a time period for the saponification reaction is preferably 5 min, and more preferably 10 min. Meanwhile, the upper limit of the time period for the saponification reaction is preferably 10 hrs, and more preferably 5 hrs. The saponification reaction may be carried out either in a batchwise system or in a continuous system. After completion of the saponification reaction, the residual catalyst may be neutralized as needed. A neutralizing agent that may be used is exemplified by organic acids such as acetic acid and lactic acid, and ester compounds such as methyl acetate.

A step of washing the modified PVA (A) may be provided subsequent to the saponification, as needed. As a washing liquid, a solution may be used comprising: a lower alcohol such as methanol as a principal component; and water and/or an ester such as methyl acetate which is identical to that generated in the saponification reaction.

Subsequently, the modified PVA (A) thus washed is dried to give the modified PVA (A). As a specific drying process, hot-air drying by using a cylindrical drier is preferred. The lower limit of a resin temperature of the modified PVA (A) during drying is preferably 100° C., and more preferably 105° C. Meanwhile, the upper limit of the resin temperature of the modified PVA (A) during drying is preferably 125° C., more preferably 118° C., and still more preferably 115° C. The lower limit of a time period for the drying is preferably 2 hrs, and more preferably 3 hrs. Meanwhile, the upper limit of the time period for the drying is preferably 5 hrs and more preferably 4 hrs. When the conditions in drying fall within the above ranges, adjusting the percentage content of the structural unit (III) in the resulting modified PVA (A) is enabled to fall within a preferred range.

The lower limit of the viscosity average degree of polymerization of the modified PVA (A) is preferably 300, more preferably 400, and still more preferably 500. The upper limit of the viscosity average degree of polymerization of the modified PVA (A) is preferably 3,000, more preferably 2,500, and still more preferably 2,000. The viscosity average degree of polymerization being equal to or greater than the lower limit leads to an improved mechanical strength of the resulting film. On the other hand, the viscosity average degree of polymerization being equal to or less than the upper limit enables solution viscosity or melt viscosity of the resin composition to be maintained within an appropriate range to thereby improve workability, and enables the cold water solubility of the resulting film to be improved. The viscosity average degree of polymerization of the modified PVA (A) is obtained by a method defined in JIS-K6726-1994.

The lower limit of the degree of saponification of the modified PVA (A) is preferably 82 mol %, more preferably 84 mol %, and still more preferably 86 mol %. Meanwhile, the upper limit of the degree of saponification of the modified PVA (A) is preferably 99.5 mol %, more preferably 99.4 mol %, and still more preferably 99.3 mol %. The degree of saponification of the modified PVA (A) being equal to or greater than the lower limit leads to improved shape stability of the resulting film, and increased cold water solubility of the film in the case of storing in a state of a package containing an alkaline substance or an acidic substance. On the other hand, the degree of saponification being equal to or less than the upper limit leads to increased productivity of the modified PVA (A) and the film. The degree of saponification of the modified PVA (A) is obtained by a method defined in JIS-K6726-1994.

The lower limit of a percentage content of the modified PVA (A) in the resin composition is preferably 30% by mass, more preferably 50% by mass, and still more preferably 70% by mass. The upper limit of the percentage content of the modified PVA (A) is preferably 99% by mass, more preferably 95% by mass, and still more preferably 90% by mass.

Amine Compound (B)

The amine compound (B) comprised in the resin composition is represented by the following formula (II).

$$H_2N-R^5 \quad (II)$$

In the formula (II), $R^5$ represents $-R^{3'}-SO_3^-X^{+'}$, $-R^{3'}-N^+(R^{4'})_3Cl^-$, or a hydrogen atom, $R^{3'}$ representing a linear or branched alkanediyl group having 1 to 10 carbon atoms, $X^{+'}$ representing a hydrogen atom, a metal atom, or an ammonium group, and $R^{4'}$ representing a linear or branched alkyl group having 1 to 5 carbon atoms, wherein a plurality of $R^{4'}$s may be identical or different.

Examples of the linear or branched alkanediyl group having 1 to 10 carbon atoms represented by $R^{3'}$ include groups similar to those exemplified in connection with $R^3$ in the formula (I), and the like.

$R^{3'}$ preferably represents a linear or branched alkanediyl group having 1 to 6 carbon atoms. Due to $R^{3'}$ thus representing the linear or branched alkanediyl group having 1 to 6 carbon atoms, chemical resistance of a film formed from the resin composition is enabled to be particularly favorable. As $R^{3'}$, —C(CH$_3$)$_2$—CH$_2$— or —CH$_2$—CH$_2$—CH$_2$— is more preferred. In the case where $R^{3'}$ represents —C(CH$_3$)$_2$—CH$_2$—, an orientation of $R^{3'}$ preferably gives H$_2$N—C(CH$_3$)$_2$—CH$_2$—, when indicated together with H$_2$N— which is adjacent to $R^{3'}$. In other words, in the case where $R^{3'}$ represents —C(CH$_3$)$_2$—CH$_2$—, as $R^5$ preferably represents —C(CH$_3$)$_2$—CH$_2$—SO$_3$X$^+$, or —C(CH$_3$)$_2$—CH$_2$—N$^+$(R$^{4'}$)$_3$Cl$^-$.

Examples of the metal atom and the ammonium group that may be represented by $X^{+'}$ include metal atoms and ammonium groups similar to those exemplified in connection with $X^+$ in the formula (I), and the like.

As $X^{+'}$, a hydrogen atom and an alkali metal atom are preferred, and a hydrogen atom and a sodium atom are more preferred.

Examples of the linear or branched alkyl group having 1 to 5 carbon atoms represented by $R^{4'}$ include groups similar to those exemplified in connection with $R^4$ in the formula (I), and the like. Of these, a methyl group is preferred.

The lower limit of the content of the amine compound (B) is 0.01 parts by mass, preferably 0.02 parts by mass, more preferably 0.03 parts by mass, and particularly preferably 0.1 parts by mass, with respect to 100 parts by mass of the modified PVA (A). Meanwhile, the upper limit of the content of the amine compound (B) is 1 part by mass, preferably 0.8 parts by mass, and more preferably 0.5 parts by mass, with respect to 100 parts by mass of the modified PVA (A). The content of the amine compound (B) being less than the lower limit leads to insufficient cold water solubility. On the other hand, the content of the amine compound (B) being greater than the upper limit leads to insufficient mechanical strength and the like.

Optional Component

The resin composition may be constituted only of the modified PVA (A) and the amine compound (B), or alternatively may further comprise, for example, a saccharide, a plasticizer, an inorganic filler, other additives and the like, in addition to the modified PVA (A) and the amine compound (B).

Saccharide

Exemplary saccharide includes monosaccharides such as glucose, oligosaccharides, polysaccharides, chain sugar alcohols, and the like. Examples of the polysaccharides include starch, cellulose, chitin, chitosan, hemicellulose, carboxymethylcellulose, methylcellulose, hydroxymethylcellulose, pectin, pullulan, agar, alginic acid, carragean, dextrin, trehalose, and the like. One or more types of these may be employed. Examples of the chain sugar alcohols include: tetritols having 4 carbon atoms such as threitol and erythritol; pentitols having 5 carbon atoms such as arabitol and xylitol; hexitols having 6 carbon atoms such as glucitol, mannitol, and sorbitol; and the like. Due to comprising the saccharide, the resin composition is capable of, in the resulting film: improving cold water solubility; improving borate ion resistance; and inhibiting a decrease of cold water solubility after packaging of a chemical, in particular a chemical that deteriorates the modified PVA (A) (a chlorine-containing substance, etc.) therein. Of these saccharides, starch is preferred. As the starch, for example, raw starches such as corn starch and potato starch; processed starches such as dextrin, oxidized starch, etherified starch, and cationized starch; and the like may be used.

In general, since PVA is hardly compatible with saccharides, if a resin composition contains a large amount of saccharide, a resulting film would exhibit significantly inferior mechanical properties such as film strength. Whereas the modified PVA (A) used in the resin composition of the embodiment is advantageously superior in compatibility with saccharides, in particular starches, and enables the resin composition to contain a large amount of saccharide. In the case where the resin composition contains the saccharide, the lower limit of the content of the saccharide with respect to 100 parts by mass of the modified PVA (A) is preferably 1 part by mass, more preferably 2 parts by mass, and still more preferably 3 parts by mass. Meanwhile, the upper limit of the content of the saccharide is preferably 100 parts by mass, more preferably 90 parts by mass, and still more preferably 80 parts by mass. When the content of the saccharide is equal to or greater than the lower limit, cold water solubility of the resulting film is improved. Meanwhile, when the content of the saccharide is equal to or less than the upper limit, impact resistance of the resulting film at a low temperature is improved.

Plasticizer

Generally, a water soluble film is required to have such strength and toughness that the film can be used in hot and humid regions as well as in cold regions, and in particular required to have impact resistance at a low temperature. Due to comprising a plasticizer, the resin composition is capable of: improving impact resistance at a low temperature; lowering a glass transition point of the film; improving water solubility; and the like.

The plasticizer is not particularly limited as long as it is a plasticizer generally used for PVA, and examples thereof include: polyhydric alcohols such as glycerin, diglycerin, diethylene glycol, triethylene glycol, propylene glycol, dipropylene glycol, trimethylol propane, pentaerythritol and 1,3-butanediol; polyethers such as polyethylene glycol and polypropylene glycol; polyvinyl amides such as polyvinylpyrrolidone; amide compounds such as N-methylpyrrolidone and dimethyl acetamide; compounds obtained by addition of ethylene oxide to a polyhydric alcohol such as glycerin, pentaerythritol and sorbitol; water; and the like. One or more types of these may be employed. Of these plasticizers, in light of improving cold water solubility, glycerin, diglycerin, diethylene glycol, triethylene glycol, propylene glycol, dipropylene glycol, trimethylol propane, polyethylene glycol and polyvinylpyrrolidone are preferred, and, in light of inhibiting a decrease of cold water solubility due to bleeding out of the plasticizer, glycerin, diglycerin, trimethylol propane, polyethylene glycol and polyvinylpyrrolidone are more preferred.

A number average molecular weight of the polyethylene glycol as the plasticizer is not particularly limited, and is preferably 100 or greater and 1,000 or less, in light of compatibility with the modified PVA (A) and of inhibiting decrease of cold water solubility due to bleeding out. A weight average molecular weight of the polyvinylpyrrolidone as the plasticizer is not particularly limited, and is preferably 1,000 or greater and 20,000 or less, in light of compatibility with the modified PVA (A).

In the case where the resin composition comprises the plasticizer, the lower limit of the content of the plasticizer with respect to 100 parts by mass of the modified PVA (A) is preferably 1 part by mass, and more preferably 10 parts by mass. Meanwhile, the upper limit of the content of the plasticizer with respect to 100 parts by mass of the modified PVA (A) is preferably 50 parts by mass, and more preferably 40 parts by mass. When the content of the plasticizer is equal to or greater than the lower limit, the aforementioned effects due to comprising the plasticizer are enabled to be sufficiently exhibited. Meanwhile, when the content of the plasticizer is equal to or less than the upper limit, bleeding out of the plasticizer is inhibited and blocking resistance of the resulting film is improved. In addition, in light of rate of dissolution of the resulting film in water, the plasticizer is preferably comprised in a proportion of 20 parts by mass or greater with respect to 100 parts by mass of the modified PVA (A). Meanwhile, in light of rigidity of the resulting film (processability in a bag making machine, etc.), the plasticizer is preferably comprised in a proportion of 40 parts by mass or less with respect to 100 parts by mass of the modified PVA (A). In light of improving cold water solubility of the resulting film, the greater content of the plasticizer is more preferred. The greater content of the plasticizer also permits lower heat sealing temperature, which tends to improve productivity of bag making with the film. Particularly, the plasticizer is preferably comprised in such a proportion that the heat sealing temperature for the resulting film is 170° C. or less, and more preferably in such a proportion that the heat sealing temperature is 160° C. or less. Since the content of the plasticizer is likely to affect strength and Young's modulus of the resulting film, it is advisable to adjust the content of the plasticizer in consideration of the strength and Young's modulus.

Inorganic Filler

Examples of the inorganic filler include: clays such as silica, calcium carbonate, aluminum hydroxide, aluminum oxide, titanium oxide, diatomaceous earth, barium sulfate, calcium sulfate, zeolite, zinc oxide, silicic acid, silicate, mica, magnesium carbonate, kaolin, halloysite, pyrophyllite and sericite; talc; and the like. These inorganic fillers may be used in combination of two or more types thereof. The lower limit of a mean particle diameter of the inorganic filler is preferably 1 μm in light of blocking resistance of the resulting film. Meanwhile, the upper limit of the mean particle diameter is preferably 10 μm in light of dispersibility in the resin composition. In order to meet concomitant required characteristics of blocking resistance of the film attained due to comprising the inorganic filler and of dispersibility of the inorganic filler in the resin composition, it is preferred to use an inorganic filler having a mean particle diameter of approximately 1 μm to 7 μm.

In the case where the resin composition comprises the inorganic filler, the lower limit of the content of the inorganic filler with respect to 100 parts by mass of the modified PVA (A) is preferably 0.5 parts by mass, more preferably 0.7 parts by mass, and still more preferably 1 part by mass in light of blocking resistance of the resulting film. Meanwhile, in light of dispersibility of the inorganic filler in the resin composition and cold water solubility of the resulting film, the upper limit of the content of the inorganic filler is preferably 20 parts by mass, more preferably 15 parts by mass, and still more preferably 10 parts by mass.

Other Additives

The resin composition may appropriately further comprise other additives such as a colorant, a flavor, a bulking filler, a defoaming agent, a releasing agent, an ultraviolet ray absorbing agent, a surfactant, and the like as needed. In the case where the resin composition comprises the surfactant, the content of the surfactant is preferably 0.01 parts by mass or greater and 5 parts by mass or less with respect to 100 parts by mass of the modified PVA (A), in light of improving releaseability of a formed film and a film forming liquid from a metal surface of a die, a drum, etc. of a film forming apparatus. Furthermore, the resin composition may also comprise a water soluble polymer such as a PVA of a different type from the modified PVA (A), polyacrylamide, and polyacrylic acid or a salt thereof as needed, within a range not leading to impairment of the effects of the present invention. Moreover, the resin composition may also comprise alkali metal salts such as sodium acetate. In the case where the resin composition comprises the alkali metal salt, the content of the alkali metal salt in terms of metal element is, for example, 0.1 parts by mass or greater and 5 parts by mass or less with respect to 100 parts by mass of the modified PVA (A).

Preparation of Resin Composition

The resin composition can be prepared by mixing the aforementioned modified PVA (A), the amine compound (B), and the optional component as needed. Specifically, the resin composition can be prepared by a known process such as: a process of dissolving or dispersing these components in a solvent in a stirring tank and then removing the solvent as needed; a process of melt-kneading these components in an extruder; and the like.

Shape of Resin Composition

A shape of the resin composition is not particularly limited and examples of the shape include powder, chip, chunk, solution, and the like. Alternatively, the resin composition may also have a shape of a film as described later, or a shape of a molded product such as various types of three-dimensional shapes.

Film

The present invention further encompasses a film formed from the resin composition. Due to being formed from the resin composition, the film is superior in cold water solubility, mechanical strength, and chemical resistance. Therefore, the film may be suitably used as a packaging material for various types of chemicals such as laundry detergents, bleaching agents and pesticides.

In light of balance between the strength and cold water solubility of the film, the lower limit of an average thickness of the film is preferably 10 μm, more preferably 20 μm, and still more preferably 30 μm. The upper limit of the average thickness of the film is preferably 200 μm, more preferably 150 μm, and still more preferably 120 μm. When the average thickness of the film is equal to or greater than the lower limit, the strength of the film is further improved. Meanwhile, when the average thickness of the film is equal to or less than the upper limit, film formation is possible at a lower cost.

In order to improve blocking resistance of the film, the film may be subjected to: roller-matting of a surface of the film; application of anti-blocking powder such as silica and starch; embossing; or the like, as needed. The roller-matting of a surface of the film may be carried out by providing beforehand fine irregularities on a roller which is to be in contact with the undried film during film formation. The embossing may be carried out generally after film formation, by nipping the film between an embossing roller and a rubber roller while applying heat and pressure. The application of powder has a great anti-blocking effect, but may be unsuitable depending on an intended usage of the film. Given this, as an anti-blocking process, the roller-matting and the embossing are preferred, and the roller-matting is more preferred in light of effectiveness in blocking prevention.

In light of practical utility of the film, the lower limit of a tensile breaking strength of the film is preferably 2.0 kg/cm$^2$, more preferably 2.1 kg/cm$^2$, and still more preferably 2.2 kg/cm$^2$. Meanwhile, the upper limit of the tensile breaking strength of the film is not particularly limited and is, for example, 5.0 kg/cm$^2$. In light of processability of the film in a bag making machine, etc., the lower limit of a Young's modulus of the film is preferably 2.0 kg/mm$^2$, more preferably 2.1 kg/mm$^2$, and still more preferably 2.2 kg/mm$^2$. Meanwhile, the upper limit of the Young's modulus of the film is not particularly limited and is, for example, 5.0 kg/mm$^2$.

A degree of cold water solubility of the film, in terms of a time period required for the film to be completely dissolved measured according to a method described later in Examples, is preferably less than 40 sec, more preferably less than 30 sec, and still more preferably less than 25 sec. It is to be noted that, in a case where the average thickness of the film is not 50 μm, the time period should be determined by converting into a corresponding value to that in a case where the average thickness of the film is 50 μm, according to the following equation (1).

Converted time period (sec)=(50/Average thickness of film (μm))$^2$×Measured time period (sec)  (1)

Production Method of Film

A production method of the film is not particularly limited and the film may be produced by a known method such as a casting process, a melt extrusion process, and the like. For example, the modified PVA (A), the amine compound (B), and the optional component as desired are dissolved in an aqueous solvent (e.g., water). The resulting solution is placed on a smooth flow casting surface to allow the aqueous solvent to evaporate, and thereafter, a uniform film according to an embodiment of the present invention is obtained by peeling away from the flow casting surface. The aqueous solvent is preferably water. The flow casting surface is merely required to be of a smooth and hard material such as steel, aluminum, glass, a polymer (e.g., polyolefin, polyethylene, polyamide, polyvinyl chloride, polycarbonate, polyhalocarbon, etc.), and the like. A rate of evaporation of the aqueous solvent may be increased by heating the flow casting surface, or by exposing the deposited solution to heated air or infrared rays. The flow casting surface may be either flat, or cylindrical as in a standard (drum type) industrial flow casting machine for film production, for example. The film is obtained by then drying in an oven.

EXAMPLES

Hereinafter, the present invention is described more specifically by way of Examples. In the description that follows, "part" and "%" are on a mass basis, unless otherwise specified particularly. The term "degree of polymerization" means "viscosity average degree of polymerization".

Degree of Polymerization and Degree of Saponification of PVA

A degree of polymerization and a degree of saponification of PVAs (including modified PVAs) were obtained by methods defined in JIS-K6726-1994.

Percentage Content of Monomer Unit (I)

A percentage content of the monomer unit (I) in the modified PVA was determined in accordance with a method using $^1$H-NMR.

Percentage Content of Structural Unit (III)

A percentage content of the structural unit (III) in the modified PVA was determined in accordance with a method using $^1$H-NMR.

Evaluation Method of Cold Water Solubility of Film

A temperature-controlled bath at 10° C. was equipped with a magnetic stirrer. A 1-liter glass beaker containing 1 liter of distilled water was placed in the temperature-controlled bath, and the distilled water was stirred by using a 5-cm stirrer bar at 250 rpm. Once the temperature of the distilled water in the beaker became 10° C., cold water solubility was measured as follows. Specifically, the film was cut out into a square of 40 mm×40 mm and placed in a slide mount. The slide mount was immersed in water being stirred at 10° C., and a state of the film being dissolved was observed. A time period required for the film to be completely dissolved was measured (in seconds). The cold water solubility was determined according to the time period required for the film to be completely dissolved, to be: "A" (favorable) in the case of less than 40 sec; and "B" (unfavorable) in the case of 40 sec or greater.

Evaluation Method of Chemical Resistance

As a chemical, 40 g of a mixture of a Bordeaux mixture and diatomaceous earth (1:3 in mass ratio) was placed in a bag of 10 cm×15 cm made from the film, and the bag was hermetically heat-sealed at 140° C. The resulting packaged bag was further wrapped in a film obtained by laminating aluminum and polyethylene and heat sealed to give a double hermetic package, whereby scattering of water and plasticizer from the hermetically packaged bag containing the chemical was prevented. In an accelerated long-term storage test, the double hermetic package was placed in a temperature-controlled chamber at 40° C. and left to stand for four weeks. The double hermetic package was taken out and the cold water solubility of the film used in the package was measured by the aforementioned method, and a change in cold water solubility over time from the film prior to packaging of the chemical was decided. The chemical resistance was determined according to the difference in the time period required for the film to be completely dissolved between before and after the accelerated test, to be: "A" (favorable) in the case of less than 5 sec; and "B" (unfavorable) in the case of 5 sec or greater.

Measuring Method of Young's Modulus and Tensile Breaking Strength (Mechanical Strength)

A film having a width of 10 mm was conditioned in an atmosphere of 20° C. and 65% RH for one week, and thereafter a tensile test was conducted by using Autograph. A distance between chucks was 50 mm and a strain rate was 500 mm/min. The mechanical strength was determined to be: "AA" (particularly favorable) in the case where the Young's modulus was 2.2 kg/mm$^2$ or greater and the tensile breaking strength was 2.2 kg/cm$^2$ or greater; "A" (favorable) in the case where at least one of the Young's modulus and the tensile breaking strength was less than the aforementioned reference value, and the Young's modulus was 2.0 kg/mm$^2$ or greater and the tensile breaking strength was 2.0 kg/cm$^2$ or greater; and "B" (unfavorable) in the case where the Young's modulus was less than 2.0 kg/mm$^2$ or the tensile breaking strength was less than 2.0 kg/cm$^2$.

Synthesis of Modified PVA (A)

Synthesis of PVA-1

A polymerization reactor (continuous polymerization apparatus) equipped with a reflux cooler, a raw material supply line, a reaction liquid taking-out line, a thermometer, aA1 nitrogen feed port, and stirring blade was used. Vinyl acetate (VAM; 656 L/hr), methanol (MeOH; 41 L/hr), a 20% by mass methanol solution of 2-acrylamide-2-methylpropane sodium sulfonate (AMPS; 146 L/hr) as a modifier, and a 2% by mass methanol solution of 2,2'-azobis(4-methoxy-2,4-dimethylvaleronitrile (AMV; 23 L/hr) were continuously supplied to the polymerization reactor by using a metering pump. Thereafter, the polymerization liquid was continuously taken out from the polymerization reactor so that a liquid level of the polymerization reactor was constant. Adjustment was made so that a polymerization rate of vinyl acetate in the polymerization liquid taken out from the polymerization reactor was kept at 40%. Residence time in the polymerization reactor was 4 hrs. The temperature of the polymerization liquid taken out from the polymerization reactor was 63 ° C. Methanol vapor was introduced into the polymerization liquid taken out from the polymerization reactor to remove unreacted vinyl acetate, whereby a methanol solution (concentration: 35%) of a modified polyvinyl acetate (modified PVAc) was obtained.

Methanol and water were added to the methanol solution of the modified PVAc to prepare a modified PVAc/methanol solution (concentration: 32% by mass) having a moisture content of 1.0% by mass (saponification raw material solution). The saponification raw material solution was fed at 4,700 L/hr, and a sodium hydroxide/methanol solution (concentration: 4% by mass; saponification catalyst solution) was fed at 248 L/hr (molar ratio of sodium hydroxide with respect to a vinyl acetate unit in the modified PVAc: 0.015). The saponification raw material solution and the saponification catalyst solution thus fed were mixed by using a static mixer. The resulting mixture was placed on a belt and maintained under a temperature condition of 40° C. for 18 min to allow a saponification reaction to proceed. A gel obtained by the saponification reaction was ground and deliquored. Modified PVA powder (resin component) thus obtained was continuously supplied to a dryer at a rate of 600 kg/hr (resin temperature: 105° C.). Average residence time of the powder in the dryer was 5 hrs. The powder was then ground to give modified PVA (PVA-1). PVA-1 thus obtained had: the viscosity average degree of polymerization of 1,500; the degree of saponification of 88 mol %; the percentage content of the monomer unit (I) of 3.0 mol %; and the percentage content of the structural unit (III) of less than 0.001 mol %.

Syntheses of PVA-2 to PVA-11

PVAs (PVA-2 to PVA-11) were synthesized by a similar procedure to that for PVA-1, except for changing conditions as specified in Table 1. A percentage content of the structural unit (III) in PVA-3 was 0.01 mol %.

TABLE 1

| | Polymerization reactor | | | | | | Saponification | | | Drying | |
|---|---|---|---|---|---|---|---|---|---|---|---|
| | VAM | MeOH | Modifier ($R^2$) (Solution) Type[1] | AMV solution | Rate of polymerization | Residence time | PVAc | Moisture content | NaOH (Molar ratio) | Resin temperature | Average residence time |
| | (L/hr) | (L/hr) | (L/hr) | (L/hr) | (%) | (hr) | (%) | (%) | | (° C.) | (hr) |
| PVA-1 | 656 | 41 | A 146 | 23 | 40 | 4 | 32 | 1.0 | 0.015 | 105 | 5 |
| PVA-2 | 656 | 58 | A 127 | 23 | 40 | 4 | 32 | 1.0 | 0.01 | 105 | 4 |
| PVA-3 | 656 | 48 | A 140 | 23 | 40 | 4 | 32 | 1.5 | 0.015 | 110 | 5 |
| PVA-4 | 656 | 78 | B 104 | 23 | 40 | 4 | 32 | 1.0 | 0.015 | 105 | 5 |
| PVA-5 | 656 | 95 | B 85 | 23 | 40 | 4 | 32 | 1.0 | 0.01 | 105 | 4 |
| PVA-6 | 656 | 58 | A 127 | 23 | 40 | 4 | 32 | 1.0 | 0.010 | 100 | 4 |
| PVA-7 | 656 | 41 | A 159 | 23 | 40 | 4 | 32 | 1.5 | 0.015 | 120 | 5 |
| PVA-8 | 656 | 170 | — — | 23 | 40 | 4 | 32 | 1.0 | 0.01 | 105 | 4 |
| PVA-9 | 656 | 50 | A 138 | 23 | 40 | 4 | 32 | 1.0 | 0.015 | 105 | 4 |
| PVA-10 | 875 | 135 | A 221 | 13 | 30 | 4 | 32 | 2.0 | 0.03 | 120 | 6 |
| PVA-11 | 656 | 21 | B 170 | 23 | 40 | 4 | 32 | 2.0 | 0.03 | 120 | 6 |

[1])Type of modifier $R^2$ A: —C(CH$_3$)$_2$CH$_2$SO$_3$$^-$Na$^+$ B: —CH$_2$CH$_2$CH$_2$N$^+$(CH$_3$)$_3$Cl$^-$ Formation of Film Example 1

To 100 parts by mass of PVA-1 synthesized as described above, 15 parts by mass of glycerin as a plasticizer, 10 parts by mass of etherified starch as a saccharide, 5 parts by mass of talc having a mean particle diameter of 3 µm as an inorganic filler, 0.8 parts by mass of sodium acetate in terms of sodium equivalent and water were added, and the amine compound (B) shown in Table 2 was further added to prepare a homogeneous 5% by mass aqueous solution (moisture content: 95% by mass). The aqueous solution was flow cast on a polyester film, dried at room temperature, and then a film having an average thickness of 50 µm, formed from a resin composition comprising 0.50 parts by mass of the amine compound (B) with respect to 100 parts by mass of PVA-1 was obtained by peeling away from the polyester film. The film thus obtained was subjected to heat treatment at 100° C. for 10 min.

Examples 2 to 7 and Comparative Examples 1 to 4

Films were formed by a similar procedure to that for Example 1, except for changing conditions as specified in Table 2.

Cold water solubility, chemical resistance, and mechanical strength (Young's modulus and strength) of the films thus obtained were measured or evaluated according to the aforementioned methods. The results are shown in Table 2.

TABLE 2

| | PVA | | | | | Amine compound (B) | | Measurement results | | | | | |
|---|---|---|---|---|---|---|---|---|---|---|---|---|---|
| | | Monomer unit (I) | | Degree of polymer- ization | Degree of sapon- ification mol % | | | Cold water solubility | | Chemical resistance[3] | | Mechanical strength | | |
| | | | | | | | | | | | | Tensile | | |
| | Name | Type[1] — | Percentage content mol % | | | Type[2] — | Content parts by mass | sec | Deter- mination | sec | Deter- mination | Young's modulus kg/mm² | breaking strength kg/cm² | Deter- mination |
| Example 1 | PVA-1 | A | 3.0 | 1,500 | 88 | X | 0.50 | 22 | A | 2 | A | 2.3 | 2.3 | AA |
| Example 2 | PVA-2 | A | 3.0 | 1,500 | 88 | X | 0.05 | 22 | A | 4 | A | 2.4 | 2.3 | AA |
| Example 3 | PVA-3 | A | 3.0 | 1,500 | 88 | X | 0.50 | 22 | A | 1 | A | 2.3 | 9.3 | AA |
| Example 4 | PVA-4 | B | 2.0 | 1,500 | 88 | Y | 0.50 | 26 | A | 3 | A | 2.3 | 2.3 | AA |
| Example 5 | PVA-5 | B | 2.0 | 1,500 | 88 | Y | 0.05 | 27 | A | 4 | A | 2.5 | 2.4 | AA |
| Example 6 | PVA-6 | A | 3.0 | 1,500 | 88 | X | 0.02 | 23 | A | 4 | A | 2.5 | 2.5 | AA |
| Example 7 | PVA-7 | A | 3.0 | 1,500 | 88 | X | 0.80 | 23 | A | 1 | A | 2.0 | 2.1 | A |
| Comparative Example 1 | PVA-8 | — | — | 1,500 | 88 | — | — | 110 | B | >5 | B | 3.2 | 3.1 | AA |
| Comparative Example 2 | PVA-9 | A | 3.0 | 1,500 | 88 | — | — | 22 | A | 6 | B | 2.4 | 2.3 | AA |
| Comparative Example 3 | PVA-10 | A | 3.0 | 1,500 | 88 | X | 2.00 | 41 | B | 2 | A | 1.7 | 1.8 | B |
| Comparative Example 4 | PVA-11 | B | 2.0 | 1,500 | 88 | Y | 2.00 | 45 | B | 1 | A | 1.8 | 1.9 | B |

[1]Type of modifier R² A: —C(CH₃)₂CH₂SO₃⁻Na⁺ B: —CH₂CH₂CH₂N⁺(CH₃)₃Cl⁻
[2]Type of amine compound X: H₂NC(CH₃)₂CH₂SO₃⁻Na⁺ Y: H₂NCH₂CH₂CH₂N⁺(CH₃)₃Cl⁻
[3]Difference in time period From the results shown in Table 2, it was proven that the films formed from resin compositions each comprising: the modified PVA (A) comprising the particular acrylamide unit, and the particular amine compound (B), wherein the content of the amine compound (B) fell within a particular range were superior in the cold water solubility, chemical resistance, and mechanical strength. On the other hand, in the case of using an unmodified PVA not comprising the monomer unit (I) (Comparative Example 1), the cold water solubility and the chemical resistance of the resulting film were inferior; in the case of not adding the amine compound (B) (Comparative Example 2), the chemical resistance was inferior; and in the case of the content of the amine compound (B) being out of the above particular range (Comparative Examples 3 and 4), the cold water solubility and the mechanical strength of the resulting film were inferior.

INDUSTRIAL APPLICABILITY

The resin composition according to the embodiment of the present invention enables formation of a film superior in cold water solubility, mechanical strength, and chemical resistance. Therefore, the resin composition and the film according to the embodiments of the present invention may be suitably used in a packaging material for various types of chemicals such as laundry detergents, bleaching agents and pesticides.

The invention claimed is:

1. A resin composition, comprising a modified polyvinyl alcohol comprising a monomer unit represented by formula (I), and an amine compound represented by formula (II):

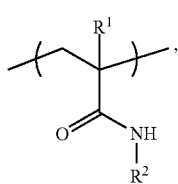

(I)

wherein in the formula (I):
R¹ represents a hydrogen atom, or a linear or branched alkyl group having 1 to 8 carbon atoms,
R² represents —R³—SO₃⁻X⁺, —R³—N⁺(R⁴)₃Cl⁻, or a hydrogen atom,
R³ representing a linear or branched alkanediyl group having 1 to 10 carbon atoms,
X⁺ representing a hydrogen atom, a metal atom, or an ammonium group, and
R⁴ representing a linear or branched alkyl group having 1 to 5 carbon atoms, wherein a plurality of R⁴s are identical or different; and $$H_2N—R^5 \quad (II),$$

wherein in the formula (II):
R⁵ represents —R³'—SO₃⁻X⁺', —R³'—N⁺(R⁴')₃Cl⁻, or a hydrogen atom,
R³' representing a linear or branched alkanediyl group having 1 to 10 carbon atoms,
X⁺' representing a hydrogen atom, a metal atom, or an ammonium group, and
R⁴' representing a linear or branched alkyl group having 1 to 5 carbon atoms, wherein a plurality of R⁴'s are identical or different,
wherein the content of the amine compound with respect to 100 parts by mass of the modified polyvinyl alcohol is from 0.01 parts by mass to 1 part by mass.

2. The resin composition according to claim 1, wherein:
the viscosity average degree of polymerization of the modified polyvinyl alcohol is from 300 to 3,000; and
the degree of saponification of the modified polyvinyl alcohol is 82 mol % to 99.5 mol %.

3. The resin composition according to claim 1, wherein the percentage content of the monomer unit represented by the formula (I) with respect to total monomer units in the modified polyvinyl alcohol is from 0.05 mol % to 10 mol %.

4. The resin composition according to claim 1, wherein: the modified polyvinyl alcohol further comprises a structural unit represented by formula (III):

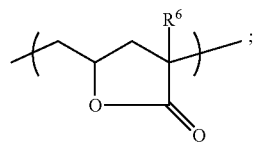 (III)

$R^6$ represents a hydrogen atom, or a linear or branched alkyl group having 1 to 8 carbon atoms; and the percentage content of the structural unit with respect to total monomer units in the modified polyvinyl alcohol is from 0.001 mol % to 0.5 mol %.

5. A film formed from the resin composition according to claim 1, wherein $R^5$ represents $-R^{3\prime}-SO_3^-X^{+\prime}$, or $-R^{3\prime}-N^+(R^{4\prime})_3Cl^-$.

* * * * *